United States Patent [19]

Aubry et al.

[11] 4,162,297

[45] Jul. 24, 1979

[54] RECOVERY OF MAGNESIUM CHLORIDE FROM BRINES

[75] Inventors: André Aubry, Mulhouse; Michel Bichara, Pfastatt-Richwiller, both of France

[73] Assignee: Mines de Potasse d'Alsace S.A., Mulhouse, France

[21] Appl. No.: 854,445

[22] Filed: Nov. 23, 1977

[30] Foreign Application Priority Data

Nov. 25, 1976 [FR] France ................... 76 35461

[51] Int. Cl.² ............................................. C01F 5/30
[52] U.S. Cl. ..................................... 423/158; 423/184
[58] Field of Search ............... 423/158, 184, 197, 497, 423/498, 164, 198

[56] References Cited

U.S. PATENT DOCUMENTS

| 3,357,800 | 12/1967 | Gaska | 23/304 |
| 3,419,347 | 12/1968 | Weissenberg | 423/498 |
| 3,440,006 | 4/1969 | Weissenberg | 423/498 |
| 4,056,599 | 11/1977 | Fox et al. | 423/497 |

Primary Examiner—O. R. Vertiz
Assistant Examiner—Wayne A. Langel
Attorney, Agent, or Firm—Millen & White

[57] ABSTRACT

Magnesium chloride can be recovered in high yield and in high purity from brines containing both magnesium chloride and alkali metal chlorides, by adding dioxane to the brine, separating the resultant precipitate from the brine and separating the dioxane contained in the precipitate from the latter.

14 Claims, No Drawings

RECOVERY OF MAGNESIUM CHLORIDE FROM BRINES

BACKGROUND OF THE INVENTION

This invention relates to a method of recovering magnesium chloride from brines containing the chloride.

Magnesium chloride is one of the main sources of magnesium, the latter being a metal which has ever increasing use since it has remarkable mechanical properties for a metal of such very light weight. Sea water or natural brines represent a nearly endless reserve of this chloride. But the recovery of magnesium chloride from such natural raw materials is a lengthy operation which necessitates cumbersome apparatus. Another source of magnesium chloride is constituted by mineral salts of oceanic origin, for example carnallite, which is a double salt of potassium and magnesium chlorides ($KCl.MgCl_2.6H_2O$). It is most often present along with varying quantities of other salts, primarily sodium chloride. Traditionally, the treatment of carnallite or carnallitic ores was directed primarily towards the recovery of potassium chloride. In such treatments, the cold or hot decomposition processes produce a waste liquor which is low in potassium chloride but rich in magnesium chloride. Other more recent methods, directed more particularly to the recovery of magnesium chloride, are based on the proposition that carnallite is decomposed underground and that there can be brought to the surface a brine which has a composition close to that of the discarded mother liquor which would be obtained by processing carnallitic ore at the surface. However, such magnesium chloride recovery techniques are not fully satisfactory and a need remains for improved processes.

SUMMARY OF THE INVENTION

Accordingly, it is an object of the present invention to provide a method for the direct recovery of solid magnesium chloride hydrate from aqueous solutions containing this chloride in the presence of alkali metal chlorides, this process being applicable to recovery of magnesium chloride from waste mother liquors as well as from brines, such as are obtained by the methods described above.

Upon further study of the specification and appended claims, further objects and advantages of this invention will become apparent to those skilled in the art.

The objects of this invention have been achieved by providing a process for the recovery of magnesium chloride from brines containing the chloride in the presence of alkali metal chlorides by treatment of the brine with dioxane.

The action of dioxane on magnesium chloride has already been studied, but only in the case of alcoholic solutions of magnesium chloride in order to recover an anhydrous form of said chloride (U.S. Pat. No. 3,446,000). Moreover, even when these solutions are derived from a magnesium containing ore such as carnallite, they contain no alkali metal chlorides but only magnesium chloride, as taught by U.S. Pat No. 3,357,800.

DETAILED DISCUSSION

The preferred dioxane for use in this invention is 1,4-dioxane, particularly that of the commercial quality called: "pure product" and containing at least 99% of 1,4 dioxane. However, other dioxanes can be used, e.g., 1,3-dioxane or dioxanes of other purities.

The addition of dioxane to the $MgCl_2$-containing brine results in the precipitation of magnesium chloride. It has indeed been found that dioxane, as opposed to most other solvents, allows a selective precipitation of the magnesium chloride, which makes it possible to separate the chloride from alkali metal chlorides with which it is generally associated. The process of the invention is thus most suitable for the treatment of brines derived from the processing of carnallitic ores, these brines containing usually 250–340 and preferably 300–330 g/l of $MgCl_2$ with much lesser amounts of alkali metal chlorides, e.g. 35–50 g/l of potassium chloride and 25–35 g/l of sodium chloride. Other brines, such as for example those derived from the processing of bischofite, and which contain more magnesium chloride and a much smaller amount of alkali metal chlorides than the carnallitic brines, can also be treated according to this process.

Experiments have indicated that, under the conditions of this invention, magnesium chloride precipitates as a complex, hereinafter called "dioxanate", which probably has the formula, $MgCl_2.6H_2O.(C_2H_4)_2O_2$.

The amount of dioxane to be used is determined by the composition of the solution or brine to be treated. As a general rule lower amounts of dioxane lead to a lower precipitation yield. Conversely, higher amounts of dioxane lead to a lower selectivity. Thus for example, for the treatment of carnallitic brines as described hereabove, amounts between 10 and 25% by volume, based on the total volume of brine and dioxane, are generally suitable. When the dioxane volume is lower than 10%, a smaller amount of solid magnesium chloride hydrate is precipitated as dioxanate with respect to the initial amount of the chloride in the treated solution. On the other hand, when the dioxane volume concentration is higher than 25%, a lowering in selectivity is observed, i.e., the precipitate which is recovered is no longer satisfactorily pure and contains increased amounts of, e.g., potassium chloride.

The precipitation is preferably performed at or near room temperature, i.e., about 21°–26° C. If desirable, lower temperatures may be employed, for example, between 20° and 0° C. or even at less than 0° C. e.g., low temperatures above the depressed freezing point of the aqueous solution, i.e., generally as low as −30° C. Such a lowering of temperature brings about an increased yield in the recovery of solid magnesium chloride hydrate. On the other hand, it has been found that the use of temperatures higher than room temperature produce no increase in the magnesium chloride recovery yield or the purity of the product obtained. Thus, although higher temperatures (e.g., 27°–50° C.) can be used, the increased energy consumption is not warranted. The pressure employed is not critical and atmospheric pressure can be used.

Under these operating conditions, the dioxanate appears as a voluminous precipitate which can be readily removed by conventional methods such as filtration, centrifugation or the like. Washing of the precipitate with a small amount of dioxane further increases the selectivity of the precipitation.

The dioxane may be recovered from both the filtrate and the dioxanate precipitate. The recovery operation is different for each.

In addition to the dissolved alkali metal chlorides, the filtrate contains most (i.e., about 65-70%) of the dioxane initially added. This solvent can be quantitatively recovered by distillation, optionally under vacuum. There is thus recovered an azeotrope containing approximately 80% dioxane and 20% water. This azeotrope per se can be used for recovering magnesium chloride from a new batch of mother liquor or brine.

The remaining dioxane, i.e., approximately 30-35% of the solvent initially provided, is present in the precipitate partly in bound form as indicated above and partly as impregnating solvent. In order to separate the latter, which constitutes at most 15% of the solvent initially provided, a simple washing of the precipitate is sufficient. The washing can be performed with cold or hot water or with cold or hot mother liquor.

The solvent which is fixed as dioxanate, and which generally represents 20-25% of the solvent initially provided, can be separated from the precipitate by drying of the latter. The temperature and duration of the drying operation are easily determined by a skilled artisan considering the characteristic features of the apparatus used. Preferred apparatus includes those in which the precipitate to be dried is maintained in motion, thereby permitting a better elimination of dioxane, for example, fluidized bed or geyser-type apparatus. Another kind of apparatus suitable for this operation is the rotating drum dryer type, with direct or indirect heating. These also permit a desirable separation of dioxane.

By way of example, experiments have shown that all of the dioxane in the precipitate can be recovered by heating, at 125° C. for two hours, the dioxanate precipitate placed in a vertical tube through which a stream of warm air flows from bottom to top. The solvent recovered in the drying gases can be used for a new operation.

The dioxane contained in the drying gases can be recovered by condensation, for example by bubbling into a cold trap. Depending on the drying conditions employed, the solvent is recovered with varying amounts of water. The recovered solvent can be added to the initial filtrate in order to be further processed for use in subsequent operations.

After the drying step, the magnesium chloride appears as a white, powdery product, having an amount of water of hydration which varies with the drying conditions employed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

This example demonstrates the influence of the dioxane concentration on the yield and selectivity of magnesium chloride precipitation.

A magnesium-containing mother liquor having the following composition was treated:

| | |
|---|---|
| $MgCl_2$ | 330 g/l |
| KCl | 40 g/l |
| NaCl | 26 g/l |

It has a density of 1.28 g/cc. In present industrial plants such a mother liquor, obtained from the cold decomposition of a carnallitic ore, is normally discarded.

500 cc portions of this mother liquor were treated with volumes of dioxane of from 40 to 500 cc. These corresponded to solvent concentrations in the mixture of 7.5 to 50% by volume.

The results are shown below:

| Dioxane volume [cc] | Dioxane concentration [volume %] | Purity of the magnesium chloride [%] | Yield [%] |
|---|---|---|---|
| 40 | 7.4 | 98.6 | 9.1 |
| 60 | 10.7 | 99.0 | 16.2 |
| 80 | 13.8 | 98.8 | 20.7 |
| 100 | 16.6 | 98.4 | 24.3 |
| 200 | 28 | 95.0 | 30.5 |
| 300 | 38.5 | 92.9 | 30.9 |
| 400 | 44.4 | 92.7 | 30.8 |
| 500 | 50 | 92.8 | 36.4 |

This Table shows that for low amounts of dioxane (7.4%, for example), the precipitation yield is low, i.e., less than 16%. On the other hand, for high amounts of dioxane, greater than 25%, the purity of the precipitate (i.e., the percent of magnesium chloride hydrate) is not higher than about 93%. However, for dioxane volume percentages of 10-25%, the purity of the product was higher than 98%. There can thus be recovered in a very pure state from conventional waste brines, about 25% of the magnesium chloride initially present.

EXAMPLE 2

This example demonstrates the influence of temperature on the precipitation of magnesium chloride hydrate.

For this experiment there was used a mother liquor containing initially:

| | |
|---|---|
| 647.6g | magnesium chloride |
| 78.3g | potassium chloride |
| 54.2g | sodium chloride |
| 1,765.9g | water |

The temperature of this mother liquor was 25° C. To the liquor was added 200 cc/liter of dioxane, i.e., an amount sufficient to achieve a concentration of 16.6 volume %. Due to the exothermic character of the reaction, the temperature rose to 35° C. Filtration was performed at this temperature. The precipitate was separated and the filtrate was allowed to cool down to 25° C. This entire process was repeated with mother liquor cooled to 13° C., 0° C. and −15° C. The results are summarized below:

| Temperature of the filtrate | 35° C. | 25° C. | 13° C. | 0° C. | −15° C. |
|---|---|---|---|---|---|
| Total yield of $MgCl_2$ hydrate (%) | 16.6 | 23.1 | 30.3 | 37.6 | 43.9 |

EXAMPLE 3

500 cc of a mother liquor containing 327.9 g/l of $MgCl_2$, 41.2 g/l of KCl and 28.0 g/l of NaCl and having a density of 1.277 g/cc, was treated with 100 cc of pure dioxane. By filtering at 15° C., there was recovered 165 g of a precipitate containing 20% dioxane. This precipitate was dried for four hours at 125° C. and the drying gases were condensed and added to the initial filtrate. There were thus recovered 580 cc of filtrate which was distilled to yield 100 g of dioxane, i.e., a recovery of 100 %. The dried salt, weighing 105 g, contained 48.6% of $MgCl_2$, 47.0% of water, 3.6% of KCl and 0.6% of NaCl, which corresponds to magnesium chloride having 5.1 molecules of water of hydration

EXAMPLE 4

500 cc of a magnesium mother liquor of density 1.268 g/cc and containing 322.7 g/l of $MgCl_2$, 37.2 g/l of KCl and 27.3 g/l of NaCl were treated with 175 cc of an 80% dioxane aqueous solution, obtained from a preceding operation.

By filtration at 15° C., there were separated a filtrate, part of which was used as a condensing agent in the recovery of the dioxane in the precipitate, and 137 g of a salt containing 20% dioxane. After drying the latter under the conditions disclosed in the preceding example, there were recovered 74 g of salt containing 40.6% water and 54.7% $MgCl_2$, which corresponds to magnesium chloride having 3.92 molecules of water of hydration. The filtrate from the initial precipitation, to which was added the fraction used to condense the drying gases, was distilled thereby recovering 135 g of dioxane, i.e., 96.4% of the initial dioxane.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of separating magnesium chloride from an aqueous brine consisting essentially of water as the solvent having dissolved therein a mixture of metallic chlorides of which magnesium chloride is present in major quantities, and alkali metal chlorides are present in substantial quantities which process comprises adding dioxane to said aqueous brine, thereby forming a magnesium chloride-containing precipitate separating the precipitate from the aqueous brine and then separating the dioxane contained in the precipitate from the precipitate to recover solid magnesium chloride hydrate.

2. A method of claim 1, wherein said aqueous brine contains 250-340 g/l of magnesium chloride, 35-50 g/l of potassium chloride and 25-35 g/l of sodium chloride.

3. A method of claim 2, wherein said brine contains 300-330 g/l of magnexium chloride.

4. A method of claim 2, wherein the amount of dioxane added is 10-25% by volume based on the total volume of dioxane added and brine.

5. The method of claim 1 which further comprises separating the precipitate from the brine and distilling the resultant separated filtrate thereby recovering an azeotrope containing approximately 80% dioxane and 20% water.

6. A method of claim 5, wherein said dioxane employed for forming a precipitate is added in the form of said azeotrope containing approximately 80% dioxane and 20% water.

7. The method of claim 1 wherein the amount of dioxane added is 10-25% by volume based on the total volume of dioxane added and brine.

8. The method of claim 1 wherein the separated precipitate is heated in order to separate dioxane therefrom.

9. The method of claim 1 wherein the precipitation is performed at about room temperature.

10. The method of claim 1 wherein the precipitation is performed at a temperature lower than room temperature.

11. The method of claim 1 wherein the dioxane is 1,4-dioxane.

12. The method of claim 1 which further comprises separating the dioxane contained in the separated precipitate from the precipitate by drying the latter thereby producing drying gases containing dioxane, and recovering the dioxane in these gases.

13. The method of claim 1 wherein the brines treated derive from the processing of carnallitic ores.

14. The method of claim 1 wherein the brines treated are waste liquors from the water decomposition of carnallitic ores.

* * * * *